United States Patent [19]

Ramsden

[11] 3,711,560
[45] Jan. 16, 1973

[54] PROCESS FOR THE PREPARATION OF UNSATURATED HYDROCARBONS AND UNSATURATED OXYGENATED COMPOUNDS

[75] Inventor: Hugh E. Ramsden, Scotch Plains, N.J.

[73] Assignee: Esso Research and Engineering Company, Linden, N.J.

[22] Filed: April 29, 1968

[21] Appl. No.: 725,200

Related U.S. Application Data

[63] Continuation-in-part of Ser. No. 625,023, March 22, 1967, Pat. No. 3,388,179, which is a continuation-in-part of Ser. No. 423,293, Jan. 4, 1965, abandoned.

[52] U.S. Cl. ..........260/632 B, 252/522, 260/75 UA, 260/80.78, 260/526 N, 260/537 N, 260/583 H, 260/583 P, 260/593 R, 260/617 R, 260/618 R, 260/631.5, 260/632 A, 260/635 E, 260/635 K, 260/638 R, 260/665 G, 260/677 R
[51] Int. Cl. ..........................C07c 33/02, A61k 7/00
[58] Field of Search....260/617, 635 E, 618 R, 631.5, 260/632 B

[56] References Cited

UNITED STATES PATENTS 2,873,297  2/1959  Ramsden..............................260/617
3,024,287  3/1962  Kennedy et al. ..................260/632 B
3,347,912  10/1967  Rowe et al............................280/617

OTHER PUBLICATIONS

Cottle et al., "J. Org. Chem.," Vol. 12, (1947), pp. 510–516, QD241.J6.
Kharasch et al., "Grynard Reactions of Nonmetallic Substances," (1954), pages 961–964, 975–977, 988, 994–999, QD77K46.
Huston et al., "Org. Chem.," Vol. 6, (1941), pp. 123–QD241.J6.
Gilman et al., "Organic Syntheses,"Coll. Vol. I, (1932) pp. 299–301, QD262Q72.

Primary Examiner—Leon Zitver
Assistant Examiner—Joseph E. Evans
Attorney—Chasan & Sinnock and J. E. Luecke

[57] ABSTRACT

Hydrocarbon polyolefins and oxygenated organic compounds, such as alcohols, glycols, ketones, diketones, and diacids, which compounds contain at least two olefinic sites of unsaturation per molecule are secured by contacting a diolefin-magnesium addition compound with various reagent systems. The organomagnesium compound has the generic formula $(R')_n Mg$ wherein $R'$ is a $C_4$ to $C_{40}$ conjugated diolefin and mixtures thereof and $n$ is an integer varying from 2 to 8.

5 Claims, No Drawings

PROCESS FOR THE PREPARATION OF UNSATURATED HYDROCARBONS AND UNSATURATED OXYGENATED COMPOUNDS

CROSS-REFERENCE TO RELATED APPLICATIONS

This application is a continuation-in-part of Ser. No. 625,023, filed Mar. 22, 1967, now U.S. Pat. No. 3,388,179, which is in turn a continuation-in-part of Ser. No. 423,293, filed Jan. 4, 1965, now abandoned.

BACKGROUND OF THE INVENTION

Field of Invention

This invention relates to processes for the preparation of unsaturated aliphatic hydrocarbons and unsaturated oxygenated organic compounds. More particularly, this invention relates to the preparation of aliphatic hydrocarbons and oxygenated hydro-carbons containing at least two olefinic sites of unsaturation per molecule through reactions involving organomagnesium compounds, in particular, addition compounds of magnesium with from 2 to 8 moles of one or more conjugated diolefins having from four to 40 carbon atoms.

Summary of the Invention

In accordance with the present invention, either unsaturated hydrocarbons having at least eight carbon atoms or unsaturated oxygenated hydrocarbons, such as alcohols, glycols, ketones, diketones, and diacids having at least 8 carbon atoms are formed by contacting an organo-magnesium compound of the formula $(R')_n Mg$ wherein $R'$ is a $C_4$ to $C_{40}$ conjugated diolefin or a mixture of conjugated diolefins and $n$ is an integer of from 2 to 8 with a specific reactant system. The reactant system employed is dependent upon the type of product desired.

When unsaturated hydrocarbons are the desired product, the organo-magnesium compounds are contacted with a hydrolyzing agent. When monoalcohols are sought, the organo-magnesium compound is reacted with either an aldehyde, an alkylene oxide, or an oxidizing agent to form an intermediate product which is subsequently contacted with a hydrolyzing agent. Glycols are formed by contacting the subject organo-magnesium compound with at least 2 moles of aldehyde, alkylene oxide, or other oxidizing agent per mole of organomagnesium compound intermediate, which intermediate is subsequently hydrolyzed to glycol product. When the ketones and diketones are the desired product, the organo-magnesium compound is first contacted with a nitrile to form an intermediate. The intermediate is subsequently contacted with a hydrolysis agent in the presence of a mineral acid. Lastly, organic dicarboxylic acids are formed by reacting the organo-magnesium compound with carbon dioxide to form an intermediate material, which intermediate is subsequently contacted with a mineral acid to form the desired product.

The reactions involved for the production of the unsaturated olefinic compound and unsaturated oxygenated hydrocarbon compounds are normally conducted at moderate temperature and pressure conditions. With the present processing schemes, valuable synthetic materials can be formed from relatively low cost, readily available materials.

The organo-magnesium compounds employed in the present reaction as well as the method used in their preparation are adequately disclosed in co-pending application Ser. No. 625,023, now U.S. Pat. No. 3,388,179, the disclosure of which is herein incorporated by reference. The halogen-free organo-magnesium compounds employed in the present processes are prepared by reacting metallic magnesium with a $C_4-C_{40}$ conjugated diolefin, preferably an acyclic conjugated diolefin, including substituted acyclic diolefins. Generally, the conjugated diolefins suitable for use in the organo-magnesium compounds are characterized by the following generic formula:

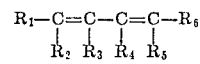

wherein $R_1$, $R_2$, $R_3$, $R_4$, $R_5$, and $R_6$ may be the same or different moieties and are composed of either hydrogen radicals or hydrocarbyl radicals, i.e., alkyl, alkenyl, cycloalkyl, cycloalkenyl, aryl, aralkyl, alkadienyl, etc. radicals. It is preferred, however, that $R_1$ and $R_2$ be hydrogen and $R_5$ or $R_6$ be hydrogen such that the carbon atom attached to a double bond is not completely substituted. While $C_4-C_{40}$ diolefins can be employed in the manufacture of the organo-magnesium compounds, it is preferred that $C_4-C_{10}$ acyclic diolefins be used. Typical examples of useful conjugated diolefins include: butadiene, 2,3-dimethyl butadiene, 2-phenyl-butadiene, isoprene, 1,4-diphenylbutadiene, myrcene, alpha-phellandrene, and the like.

In the reaction of olefins with magnesium, both valences of the magnesium are satisfied by hydrocarbon radicals. The organo-magnesium compounds are prepared by simply contacting finely divided metallic magnesium materials such as turnings, pellets, granules or even powdered magnesium with at least two moles of diolefin per mole of magnesium, although any molar ratio that will form some organo-magnesium compound may also be used. Generally, however, the molar ratio of the reactants will range from stoichiometric to about a 50 percent excess of diolefin. The diolefin reagent may be composed of a single hydrocarbon specie or may be a mixture of materials, such as a mixture of butadiene and isoprene, in order to form butadiene-isoprene magnesium adducts. Preferably, prior to contacting the magnesium with the diolefin reagent, the magnesium is activated by treatment with a small quantity, i.e. 2-3 cubic centimeters per mole of magnesium, of a $C_1$ to $C_{10}$ alkyl halide or sulfate, preferably halides, more preferably lower alkyl halides, e.g. methyl iodide, methyl bromide, ethyl bromide, ethylene bromide, etc. Elemental iodine may also be used to activate the magnesium. Activation can also be achieved by abrading or breaking the surface of the magnesium by subjecting same to intense grinding.

The magnesium-diolefin adducts may contain from 2 to 8 moles of diolefin per mole of magnesium. It is not known how the extra olefin molecules add to the divalent magnesium, but it is generally believed to be via an insertion reaction either at a magnesium-carbon bond or at a carbon-carbon bond.

Normally, the magnesium-diolefin adducts are prepared in the presence of a $C_4-C_{12}$ saturated cyclic ether such as tetrahydrofuran, tetrahydropyran and the lower alkyl or lower alkoxy derivatives thereof. The organo-magnesium formation reaction is conducted at temperatures varying from about 20 to about 150°C., preferably 65° to 150°C., for from about 6 to 32 hours. Increased reaction times are necessary, e.g. up to 120 to 200 hours, or longer, when it is desired to form compounds wherein more than 2 moles of diolefin reacts with the magnesium.

As noted hereinbefore, the instant organo-magnesium compounds are contacted with a reactant system selected to produce either olefinic hydrocarbon compounds having at least eight carbon atoms and at least two carbon-carbon ethylenic sites of unsaturation or unsaturated oxygenated hydrocarbons having at least eight carbon atoms and at least two carbon-carbon ethylenic sites of unsaturation. The overall reactions contemplated by the instant invention are set forth in the following generalized equations:

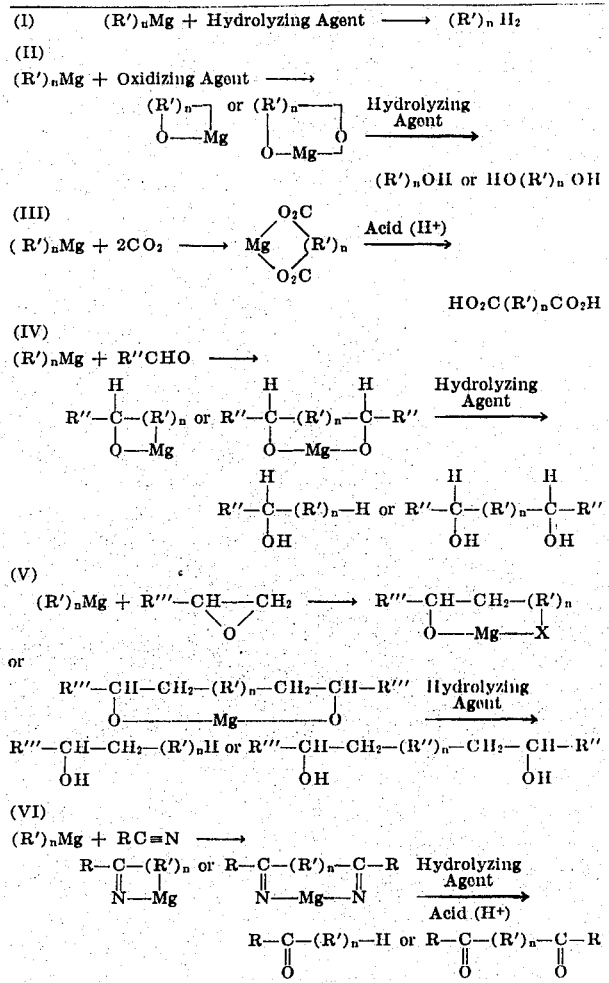

Equation I illustrates the reaction of organo-magnesium compounds with a hydrolyzing agent in amounts sufficient to obtain an olefinic hydrocarbon product. Equation II illustrates the reaction of the organo-magnesium adducts with an oxidizing agent in order to arrive at mono and dioxygenated intermediates which are subsequently reacted with a sufficient quantity of hydrolyzing agent to arrive at either monoalcohols or glycols. Whether the product will be composed predominantly of monoalcohol or glycol is dependent upon the amount of oxidizing agent initially employed relative to the amounts of organo-magnesium compound present within the reaction zone. To secure products composed predominantly of monoalcohols, the organo-magnesium compound is first oxidized with an oxidizing agent used in amounts of not more than 1.0 mole oxygen equivalent of oxidizing agent per mole of organo-magnesium, preferably 0.1 to 1.0 molar equivalents of oxygen and more preferably 0.025 to 1.0 mole equivalents per mole of organo-magnesium. When products composed predominantly of glycols are desired, any amount of oxidizing reagent greater than about 1.0 mole of oxygen equivalent per mole of organo-magnesium may be used, preferably 1.0 to 10, more preferably 1.0 to 2.0 moles/mole, e.g., 2 moles of oxygen equivalent, i.e., $O_2$ for best results.

Equation III illustrates the reactions employed in the formation of dicarboxylic acids. As is shown in the equation, the acids are formed by contacting an intermediate formed by the reaction of the organo-magnesium compound with at least two moles of carbon dioxide with an acid reagent. It is desirable that at least about 2 moles of acid be employed per mole of intermediate. Normally, however, an excess, greater than 2 moles of acid per mole of intermediate, is used.

Equation IV illustrates the reactions involved in the formation of monoalcohol and glycol products through reactions of aldehydes with the organo-magnesium compounds. In the reaction, the aldehyde is reacted with the organo-magnesium compound to secure either a mono- or di-oxygenated intermediate which upon hydrolysis yields either the monoalcohol or glycol. Products composed predominantly of monoalcohol material are formed when molar ratio of aldehyde to organo-magnesium compound varies from 0.5 to 1.2, preferably 0.9 to 1.1. When the molar ratio of aldehyde to organo-magnesium compound varies from 1.2 to 2.5, preferably 1.9 to 2.1, the products secured are composed predominantly of the glycol material.

Equation V demonstrates the formation of monoalcohols and glycols in reactions involving the use of organo-magnesium compounds and 1,2-alkylene oxides. As noted in the equation, the initial reaction between the organo-magnesium compound and the alkylene oxide results in the formation of intermediates, which intermediates are brought to the desired alcohol products by reacting the same to a hydrolyzing agent. The amounts of alkylene oxide employed in the reaction relative to the amounts of organo-magnesium used is determinative of the types of products to be obtained. When less than 1 mole of alkylene oxide per mole of organo-magnesium compound is used, the products tend to be composed predominantly of the mono-oxygenated derivative which upon hydrolysis yields the monoalcohol. When larger quantities of alkylene oxide are employed relative to the amount of organo-magnesium compound present in the reaction zone, such as greater than 1:1 molar ratio of alkylene oxide to organo-magnesium, the resulting reaction product tends to be composed predominantly of the dioxygenated intermediate which upon hydrolysis yields a glycol.

Lastly, mono and diketones can be formed by contacting the organo-magnesium compound with a mononitrile which results in the formation of mono- and di-imino compounds which upon contact with a hydrolyzing agent and an acid reagent yields either mono- or diketones. Much like the previous reactions, where a product composed predominantly of mono- or diketones will be obtained is dependent upon the molar ratio of nitrile to organo-magnesium compound employed in the initial reaction system. Where the molar ratio of nitrile to magnesium compound is less than 1:1, the intermediate formed tends to be predominantly the mono-imino compound. When the molar ratio of nitrile to magnesium compound exceeds 1:1, the product is composed predominantly of the di-imino compound. If desired, the intermediate imino compounds can be hydrogenated to yield mono- and diamines. Generally, at least about 2 moles of acid reagent are employed in the final hydrolysis step of reaction VI to aid in the formation of the monoketone and diketone products. Larger amounts of acid reagent can be used.

The reactions illustrated in Equations IV, V and VI show the contacting of the organo-magnesium compound with an aldehyde, a 1,2-alkylene oxide, or a nitrile. In situations where the di-oxygenated derivative or di-imino compound is the desired intermediate, at least about 2 moles of aldehyde, alkylene oxide or nitrile must be employed per mole of organo-magnesium compound. The addition of these reagents to the organo-magnesium compound may be all at once or the addition may be carried out in a sequential manner, that is, the organo-magnesium compound contacted with reagent in amounts sufficient to form the mono-oxygenated derivative or mono-imino compound followed by the addition to the intermediate of a second mole of reagent in order to secure the di-oxygenated derivative or di-imino compound. In the sequential additions, the reagent employed in forming the first mono-derivative need not be the same as that used in the reaction of that derivative with the second mole of reactant. For example, one mole of phenylpropyl aldehyde could be reacted with 1 mole of the organo-magnesium compound in order to arrive at the initial mono-oxygenated intermediate compound. Thereafter, this intermediate could be reacted with one mole of allyl aldehyde in order to secure a product composed predominantly of the di-oxygenated derivative. With this technique, it is possible to form a wide variety of high molecular weight alcohol and ketone products having a multiplicity of differing functional groups.

The hydrolyzing agent referred to with respect to the above reactions can be any compound having an active hydrogen, i.e., a hydrogen that is readily replaced from the molecule. Typical examples of useful hydrolyzing agents include: water, mineral acids, e.g., sulfuric acid, hydrochloric acid, phosphoric acid; $C_2-C_{10}$ organic acids, e.g., acetic acid, valeric acid, propionic acid, etc; phenols, amino compounds having active hydrogens; and the like. Basic hydrolyzing agents while operable, are generally not desired for use, especially in conjunction with water, since they tend to precipitate the magnesium as magnesium hydroxide which makes the resulting products more difficult to recover. The preferred hydrolyzing agents are dilute water solutions of mineral and organic acids such as sulfuric acid, acetic acid, citric acid, tartaric acid, hydrochloric acid, and generally any organic monoacid or diacid except odorific materials, e.g., butyric acid, scaproic acid, etc. When dilute acid-water solutions are employed as the hydrolyzation agent, the water actually serves as the hydrolyzation agent and the acid present serves to cause the magnesium to be held in an agreeable form.

The hydrolyzing agent is normally used in a stoichiometric amount, i.e., 2 moles/per mole of magnesium, or more, for complete reaction.

The oxidizing agent used in the reaction embodied in equation II may be oxygen (considered to have 2 moles of oxidizing agent (O) per mole), as such, or as air, or as oxygen combined with an inert gas, such as helium, nitrogen, or argon. Peroxides such as benzoyl peroxide, lauryl peroxide and dicumyl peroxide may also be used. Air is normally employed as the oxidizing agent.

The acid reagent employed in the reactions exemplified by Equations III, and VI may be water diluted hydrochloric, sulfuric and phosphoric acids, tartaric acid, citric acid, maleic acid or acetic acid.

As noted previously, aldehydes having the formula R"CHO, 1,2-alkylene oxides having the formula

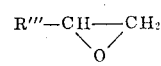

and mono-nitriles having the formula $R—C \equiv N$ are employed as reactants in the formation of unsaturated oxygenated compounds according to the present invention. The values of R", R"' and R of these compounds may be either a hydrogen radical or an organic radical having from one to 30, preferably one to 18 carbon atoms. When either R, R" or R"' is an organic radical the values may represent (1) a $C_1-C_{30}$ alkyl group, preferably a $C_1-C_{12}$ primary or secondary monovalent alkyl group, e.g., methyl, n-propyl sec-butyl, n-hexyldecyl, octadecyl, dodecyl, etc.; (2) a $C_6-C_{20}$ aryl group, preferably a $C_6-C_{12}$ monovalent aryl group, e.g., phenyl, naphthyl, phenanthryl, etc.; (3) a $C_7-C_{30}$, preferably a $C_7-C_{18}$ alkylaryl group, e.g., nonylphenyl, octadecylphenyl, tolyl, etc.; (4) a $C_7-C_{30}$, preferably a $C_7-C_{18}$ arylalkyl group, e.g., benzyl, xylyl, naphthylmethyl, phenylisopropyl, etc.; and (5) a $C_2-C_{12}$ monovalent alkenyl group, e.g., propynyl, hexynyl, etc.

Representative, non-limiting examples of the useful reagents include propylene-1,2-oxide, butylene-1,2-oxide, styrene oxide, glycidyl ethers, butadiene monoepoxide, butadiene bis epoxide, vinylcyclohexene oxides, cyclohexene epoxide, allene monoxide, isoprene monoxide, acetaldehyde, formaldehyde, paraformaldehyde, propanol, butyraldehyde, isobutyraldehyde, citral, citronellal, amylaldehyde, hexaldehyde, benzaldehyde, chlorobenzaldehyde, anisaldehyde, vanillin, acetonitrile, succinonitrile, maleonitrile, propionitrile, butyronitrile, benzonitrile, benzyl cyanide, etc.

The reactions employed to secure the high molecular weight hydrocarbon olefins and high molecular weight unsaturated oxygenated hydrocarbons are normally conducted in the presence of a solvent. The solvent employed may be the same as the ones used in the preparation of the organo-magnesium compound, such as $C_4-C_{12}$ saturated cyclic ethers. However, there is no necessity that the cyclic ether solvent be employed as the reaction can be conducted in conventional hydrocarbon diluents. Materials that contain active hydrogen atoms such as alcohols, amines, etc. should be avoided. Halogenated hydrocarbon solvents should also be avoided as such materials sometimes form detonatable mixtures with the organo-magnesium compounds. Diluents such as aromatic hydrocarbons, e.g., benzene, toluene, xylene; as well as straight chain, branched chain and cyclic chain aliphatic hydrocarbons such as hexane, heptane, cyclohexane, 2,2-dimethyl octane, etc. may be employed in amounts sufficient to provide a fluid reaction medium. Generally, from 1 to 10 volumes, preferably 1 to 2 volumes of solvent are employed per volume of organo-magnesium compound.

The reaction temperature and pressures employed within the reaction zone during the course of the formation of both the unsaturated hydrocarbons and the oxygenated materials may vary over a wide range. Temperatures varying from about −70°C. to reflux, i.e., 70° to about 165°C., depending upon the organo-magnesium substituent and the solvent employed, can be used. Preferably the temperatures vary from about 0° to 30°C. and more preferably from about 10° to 30°C. The pressure within the reaction zone is not critical. Normally, sufficient pressure is applied to the system to maintain the organo-magnesium compound and solvent in the liquid phase. Pressures varying from subatmospheric, e.g., 0.1 atmosphere, as well as superatmospheric pressures, e.g., 100 atmospheres may be used. The length of the reaction period depends primarily upon the choice of process reactants. Optimum reaction times may vary in the range of five to ten minutes to three or more days. The reactions involving the use of organo-magnesium compounds proceed rapidly at the above described temperature and pressure conditions. Hence, there is no need to employ a catalyst to promote the reactions.

In a typical reaction procedure for the preparation of a monoalcohol from an organo-magnesium compound, di-isoprene magnesium is introduced into a reaction zone and then diluted with a sufficient quantity of solvent such as tetrahydrofuran, to insure a non-viscous reaction system. Thereafter, air is bubbled into the reaction system in amounts sufficient such that not more than 0.5 mole of oxygen (1 equivalent) is employed per mole of magnesium contained in the organo-magnesium compound. Air addition is commenced at room temperature and the rate at which the air is introduced into the system is maintained at a level such that the temperature of the system does not exceed about 40°C. Prior to introduction to the reaction zone, the air is passed through a water absorption tube containing sulfuric acid and a $CO_2$ absorption tube containing Ascarite ( a basic material that reacts with $CO_2$).

Upon completion of the oxidation, the reaction mixture and the vessel are cooled using an ice bath or other suitable cooling system and a minor quantity of water introduced into the reaction zone. The water is introduced slowly to prevent the temperature of the system from exceeding 40°C. Thereafter, 2 moles of hydrogen chloride for every mole of magnesium initially introduced into the reaction system is transferred to the reaction zone diluted in water. During acid addition the temperature of the reaction system is maintained at a temperature below about 25°C. Upon completion of the hydrolysis, the reaction system is admixed with about 30 volume percent of hexane and the organic layer is separated from the water layer of the system. The water layer is washed two times with hexane and the hexane extract and original organic layer combined. The hexane and tetrahydrofuran solvent are then removed from the product with the use of a rotary vacuum distillation apparatus.

The alcohols prepared using the above described technique are useful as odor chemicals for the perfume industry. $C_{10}$ alcohols, prepared from di-isoprene magnesium compositions are particularly important because they are believed to be isomers of linalool (a tertiary $C_{10}H_{18}O$ alcohol) and geraniol (a primary $C_{10}H_{18}O$ alcohol), both naturally occurring substances that are widely used in perfumes. However, the alcohols prepared with the above described procedures are difficult to analyze since they are comprised of a large number of isomeric substances.

The products formed with the instant processes have many varied uses. As stated above, the monoalcohols formed with the processes of the present invention are useful as perfume and flavor chemicals and intermediates. More particularly, certain $C_{10}$ alcohols possess a pine oil odor which is desirable in household detergents and disinfectants. Secondary alcohols, such as

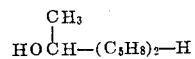

are exceptionally fragrant and possess great potential as perfume intermediates. The olefinic hydrocarbon materials formed with the present process can be used as the third component in rubbery terpolymer systems, such as terpolymers of ethylene, propylene and the present non-conjugated diolefinic material having at least eight carbon atoms. Rubbery materials so formed can be used for standard rubber applications such as in tires, hoses, mountings, etc. The unsaturated dicarboxylic acids formed by the reaction of carbon dioxide with the organo-magnesium compounds are useful as paint drying oils. When hydrogenated, the diacids are the suitable base constituent for ester products which are useful in lubricating oils or as the acid constituent for diester and polyester plasticizer systems for polyvinylchloride. The acids can also be used in the preparation of alkyd resins and polyamides. The glycol products formed with the instant processes may when reacted with mono- or diacids be used as plasticizers or in the synthesis of polyesters. Ketones and diketones are useful as perfume and flavor ingredients, and as intermediates for the synthesis of pesticides and the like.

DESCRIPTION OF THE PREFERRED EMBODIMENTS

The invention will be further understood by reference to the following examples. All of the reactions were carried out under an inert nitrogen atmosphere, except where otherwise specified, which atmosphere was controlled under static conditions of a few centimeters of hydrocarbon pressure by the use of an immersion bubbler. The diolefins employed in the manufacture of the diolefin magnesium adducts were not freed of polymerization inhibitors prior to use and all starting materials were used without prior purification. Time of flight measurements were made on a Bendix spectrometer coupled with a temperature program F & M 500 gas chromatograph. Capillary gas chromatography was obtained with a 300 foot R-column operated at 100°C., the injection block temperature being 150°C., and the detector block being maintained at 160°C. Preparative gas chromatographic separations were performed in an Aeroprep unit using a 20 foot × ⅜ inch 20 percent squalane column. Column temperature was maintained at 100°C. and the injector and detector blocks were maintained at 200° C. Nuclear magnetic resonance spectra were obtained at 60 MC on a Varian A 60.

EXAMPLE 1

A 175 milliliter sample of di-isoprene magnesium was rapidly added to a glass reaction vessel containing a chilled dilute ammonium chloride water solution. The aqueous phase was separated from the organic phase and the organic phase extracted with n-pentane. The resulting pentane solution was washed three times with small quantities of water and then dried over sodium sulfate. This solution was then filtered and introduced into a short path distillation apparatus. Two distillate fractions were obtained. The first fraction having a boiling point between 165° and 180°C. at 760 millimeters of mercury pressure weighed 16 grams and the second fraction which exhibited a boiling point varying between 138° and 144°C. at 26 millimeters of mercury pressure weighed 2 grams. Both fractions were fragrant terpene-like unsaturated hydrocarbons. Infrared and gas chromatograph analysis showed both fractions to be practically identical. The calculated composition of the hydrocarbon, $C_{10}H_{18}$ contains 86.95 wt. % carbon and 13.05 wt. % hydrogen. The composition obtained from the reaction contained 86.80 wt. % carbon and 13.51 wt. % hydrogen. The calculated bromine number for the composition was 230. The bromine number of the materials secured from the reaction was 208.

EXAMPLE 2

In a 5 liter, four-neck flask, equipped with an anchor stirrer, thermometer, reflux condenser, and dropping funnel was placed 8 gram atoms (194.4 grams) of magnesium turnings. The magnesium turnings were initiated by contacting the same with 5 milliliters of ethylene dibromide and 5 milliliters of tetrahydrofuran. To this mixture was added a solution of 8 moles of isoprene contained in 1,400 milliliters of tetrahydrofuran. The isoprene and tetrahydrofuran were added with stirring at the reflux temperature of the mixture. The total mixture was added over a period of 7 hours and 56 minutes. At the completion of the addition, the reflux temperature of the mixture was 53°C. At the end of this time the reaction was stopped and restarted the following day wherein a further 8 moles of isoprene and 700 milliliters of tetrahydrofuran were added over a period of 8 hours. Refluxing of this mixture was continued for 48 hours and then a liter of tetrahydrofuran was added and refluxing continued for another 32 hour period. After cooling, the reaction mixture was sampled and the sample was found to contain a 0.21 milliequivalents of di-isoprene-magnesium per milliliter of solution.

This solution, after standing under nitrogen atmosphere for a protracted period was then hydrolyzed by contacting the same with 600 milliliters of methanol, one liter of water and 16 moles of hydrochloric acid as concentrated (12 N) acid. Following contacting, the organic and aqueous layers were separated and the organic layer concentrated in a rotary film evaporator to yield 1,021 grams of terpenes boiling above 80°C. at 40 millimeters of mercury pressure. Theoretical yield would be 1,088 grams of diolefinic material.

EXAMPLE 3

One mole of di-isoprene magnesium [$(C_{10}H_{16})$ Mg] solution is introduced into a flask equipped with a gas inlet tube and air (or oxygen) is bubbled into the mixture until the equivalent of one-half mole of oxygen has been emitted. The solution is then hydrolyzed with 100 milliliters of water to remove the unreacted tertiary carbon-magnesium linkage. Sufficient dilute hydrochloric acid (about 2 moles) is added to solublize the $Mg(OH)_2$ and the organic and aqueous layers separated. After removal of solvent, the residual alcohols from the organic layer are subjected to vacuum fractionation. In several repeats of this procedure, mixtures of terpene alcohols having very pleasant odors are obtained.

EXAMPLE 4

One mole of a di-isoprene-magnesium compound is placed in a reaction flask similar to that employed in Example 3. One mole of acetic acid is added very slowly with cooling and vigorous agitation. As soon as this reaction is complete (the partial hydrolysis to remove one-half of the carbon to magnesium bonds, the more reactive one) air or oxygen is bubbled into the mixture. The mixture may be diluted, if necessary, with more tetrahydrofuran or other unreactive solvent. The mixture is then treated with water-hydrochloric acid solution, the resulting organic and aqueous layers separated, the organic layers stripped of solvent and the resulting organic residue fractionated under vacuum conditions.

In this example, those most reactive centers which react readily with oxygen as is shown in Example 3 are removed and the less reactive centers then react with oxygen to give alcohols similar to but different from those obtained in Example 3. Both series were terpene alcohols having delicate and delightful fragrances. This product is quite similar to or contains linalool.

EXAMPLE 5

One gram of magnesium (24.3 grams) was charged to a flask equipped with a magnetic stirrer. The flask was swept with dry nitrogen and 2 milliliters of ethylene bromide and 6 milliliters of tetrahydrofuran were added to the reaction vessel whereupon the temperature of the flask contents rose to 40°C. Two moles of isoprene in 600 milliliters of tetrahydrofuran were then added slowly to the flask over a period of about 3.5 hours. The temperature of the flask contents then dropped to 43°C. after addition was started. Heating of the vessel was started. After about 15 minutes of heating the flask contents reached a temperature of 51°C. and the flask contents began to exhibit a green coloration. Upon completion of the addition of the isoprene and the solvent, temperature at reflux was 57°C. and the reaction mixture exhibited a deep yellow-amber color. Heating at reflux was continued, the temperature gradually climbing to 65°C., at which temperature nearly all of the magnesium was observed to have dissolved and the color of the product was a very dark black green.

This material was then carbonated by contact with dry gaseous carbon dioxide at a temperature of about 10°C. under inefficient magnetic stirring. Three products were obtained — a hydrocarbon, a monoacid (Acid No. Found 196, Theory 305), and a dibasic acid (Acid No. 440, Theory 496). Nuclear magnetic resonance analysis indicated the presence of

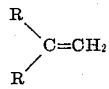

groups. The iodine number for the monoacid was 330. For the hydrocarbon it was 370. The hydrocarbon slowly polymerized on standing.

EXAMPLE 6

An adduct of 1 mole of magnesium with 8 moles of isoprene contained in 800 milliliters of tetrahydrofuran was admixed with 1 liter of toluene and the total mixture cooled to 10°–15°C. through contact with an ice bath. Thereafter, dry carbon dioxide gas was admitted to the mixture. The temperature of the mixture was controlled at or below 20°C. by ice bath cooling and careful control of the rate of admission of the $CO_2$. The carbon dioxide addition required 1.5 hours, after which the reaction mixture was heated to 50°C. under a $CO_2$ atmosphere. Carbon dioxide admission was continued overnight at room temperature. Thereafter, 500 milliliters of water was added to the system. There was no rise in temperature of the system upon water addition indicating complete reaction.

The tetrahydrofuran was then distilled from the reaction mixture and the residual solution acidified with aqueous acid, the acid being contained in the organic layer. After separation of the organic layer from the aqueous layer, the organic layer was extracted with 1 liter of water containing 80 grams of sodium hydroxide. The resulting organic layer was then evaporated to yield an orange liquid weighing 32.4 grams having an acid number of 9.94 and a molecular weight of 252. After acidification of the sodium hydroxide containing extract, the acids were extracted from the water by use of ethyl ether. After the ether had been evaporated, a liquid material and a solid material were obtained and were separated by filtration. The red brown liquid material weighed 82.6 grams and had an acid number of 297. The solid material weighed 81.1 grams and had a molecular weight of 668 and an acid number of 215. Theory for $(C_5H_8)_8(CO_2H)$ is a molecular weight of 634 and acid number of 177.

EXAMPLE 7

To a 2 mole myrcene-magnesium adduct was slowly added with cooling, 2 moles (116 grams) of propylene oxide. During addition, the temperature of the system rose rapidly to about 60°C. despite external cooling. The addition required 7.5 hours. The final reaction mixture was a solid. The solid material was placed in a 4-liter beaker, softened with 2.5 liters of benzene and treated with 190 milliliters of concentrated HCl contained in 500 milliliters of water. A further treatment with 500 milliliters of water and 1 liter of benzene allowed separation of the viscous organic layer from the water layer. The organic layer was evaporated to yield a yellow oil semisolid having a hydroxyl number of 212.4 (Theory 288).

EXAMPLE 8

Into a 2-liter, four-neck flask equipped with condenser, air stirrer, and thermometer was added 1,000 milliliters of tetrahydrofuran and 1 mole of an isoprene-myrcene magnesium adduct having the formula $C_5H_8$—Mg—$C_{10}H_{16}$. Air was then bubbled to the solution after first passing the same through a water absorption tube containing sulfuric acid a $CO_2$ absorption tube containing Ascarite. The air was introduced into the reaction vessel at a rate of approximately 1 liter every 10 minutes. The reaction was commenced on one day and 42 liters of air were admitted during that period. The reaction mixture then was permitted to stand overnight with stirring and nitrogen inflow. During the next day, 15.5 additional liters of air were introduced into the reaction zone.

Upon completion of the air introduction, 50 milliliters of water were slowly introduced into the system over a 45 minute period. During water addition the reaction vessel was positioned within an ice bath which served to maintain the contents of the reactor below about 40°C. Thereafter, 2 moles (160 milliliters) of concentrated hydrochloric acid diluted to 500 milliliters of water was introduced to the reaction contents over a 1 hour period. The temperature of the reaction vessel was maintained below about 25°C. by immersing the reaction vessel in an ice bath. After acid addition, the reaction contents were vigorously stirred for one-half hour. Thereafter, 500 milliliters of n-hexane was admixed with the crude reaction product and the organic and water layers separated. The separated water layer was washed 2 times using 250 milliliters of n-hexane. The hexane extracts and the organic layer were then combined and the solvents and tetrahydrofuran evaporated from the crude reaction product on a rotary vacuum distillation apparatus. 137.5 grams of a crude alcohol product were thus obtained.

EXAMPLE 9

Into a 2-liter, 4-neck flask equipped with a magnetic stirrer, thermometer, dropping funnel and condenser was introduced 0.8 mole of an isoprene-butadiene magnesium adduct having the formula $C_5H_8$—Mg—$C_4H_6$. Propylene oxide (0.8 mole) dissolved in 200 milliliters of tetrahydrofuran was added slowly to the magnesium adduct over a period of 3 hours. During propylene oxide addition, the reaction vessel was positioned within an ice bath and the maximum temperature of the reaction system during propylene oxide addition was 35°C. The total mixture was then permitted to stand overnight under a nitrogen atmosphere. The following day, the mixture was heated to 60°C. and maintained at this level for 1 hour. Thereafter, the flask was placed in an ice bath and 50 milliliters of water was slowly introduced such as to maintain the reaction mixture temperature to below 30°C. One hundred and thirty milliliters of concentrated hydrochloric acid diluted in 370 milliliters of water were then added to the reaction system at a rate such that the reaction temperature did not exceed 30°C. After acid addition, the reaction mixture was stirred vigorously for 0.5 hour and 500 milliliters of hexane added to the system. The organic and aqueous layers were then separated and the water layer washed two times using 200 milliliters of hexane each time. The hexane abstracts were combined with the organic layer and the tetrahydrofuran hexane evaporated from the product. The crude secondary alcohol product secured weighed 115.5 grams.

EXAMPLE 10

One mole of di-isoprene magnesium having the formula $(C_5H_8)_2Mg$ contained in 1,000 milliliters of tetrahydrofuran was charged to a 2-liter, 4-neck flask equipped with air stirrer, thermometer, dropping funnel, and condenser. One mole of ethylene oxide (44 grams) dissolved in 200 milliliters of tetrahydrofuran and was added slowly to the reaction zone over a 4 hour period. During addition of the ethylene oxide, the reactor contents were maintained below a temperature of 30°C. by positioning the reactor in an ice bath. After the completion of the addition of the ethylene oxide, the reaction mixture was heated to reflux (65°C.) for 1 hour, the reaction mixture cooled by immersing the flask in an ice bath and 50 milliliters of water slowly added to the system. Thereafter, 175 milliliters of concentrated hydrochloric acid diluted with 425 milliliters of water was introduced and the total mixture stirred for 0.5 hour. During HCl addition the reaction temperature was kept below about 30°C. by positioning the reactor within an ice bath. The crude monoalcohol product was then contacted with 500 milliliters of hexane and the aqueous and organic layers separated. The water layer was washed with 250 milliliters of hexane and the extract obtained therefrom was combined with the organic layer and the solvent evaporated from the crude product. The crude alcohol product consisted of 162 grams of material.

EXAMPLE 11

Two parallel experiments were conducted wherein dibutadiene magnesium was reacted with acetaldehyde. In the first experiment, the molar ratio of acetaldehyde to magnesium compound was 2:1. In the second experiment, the acetaldehyde/magnesium compound molar ratio was 1:1. In the first experiment 17.4 grams of acetaldehyde were used. In the second experiment 8.7 grams of acetaldehyde were employed. In each instance, the acetaldehyde, dissolved in 200 milliliters of tetrahydrofuran, was introduced to a 1 liter, 4-neck reaction flask equipped with a condenser, thermometer, magnetic stirrer, and dropping funnel. The dibutadiene magnesium (0.20 mole) was then added slowly dropwise to the reaction flask. During the addition of the organomagnesium compound, the flask was immersed in an ice bath and the flask contents maintained at a temperature below 30°C. Addition of the organo-magnesium compound was completed over a 1-hour period. After addition of the reagents, the mixtures were heated to reflux (about 55°C.) and maintained at this level for 1.5 hours. Thereafter, the reaction mixture was cooled in an ice bath and 50 milliliters of water and 0.5 mole of HCl dissolved in 150 milliliters of water were introduced over a two-hour period. During water and acid addition, the reaction temperature was maintained below 30°C. by immersing the flask within an ice bath.

The crude product was obtained from the reaction mixture by introducing the total reaction mixture into a separatory funnel and admixing the same with 200 milliliters of benzene. The organic layer and water layer were separated and the water layer washed 2 times using 100 milliliters of benzene for each extraction. The extracts and organic layer were then combined and the solvent evaporated from the crude product using a rotary vacuum distillation apparatus.

The product of the first reaction (molar ratio of acetaldehyde to organo-magnesium compound being 2:1) consisted of 11 grams of secondary alcohol material exhibiting boiling points varying from 45°–165°C. at 0.5 millimeters of mercury pressure. The second product consisted of 10 grams of secondary alcohol material boiling between 46°–125°C. at 0.5 millimeters of mercury pressure. One cut of the product, consisting of 4 grams, and boiling between 90°–125°C. solidified to a white solid on standing.

EXAMPLE 12

Two hundred milliliters (0.2 mole) of an isoprene-butadiene magnesium adduct having the formula $C_5H_8-Mg-C_4H_6$ were charged into a 1-liter, four-neck flask equipped with a magnetic stirrer, thermometer, dropping funnel and condenser. Six grams of paraformaldehyde (0.20 mole) was then slurried in 200 milliliters of tetrahydrofuran and added dropwise to the organo-magnesium compound over a 45 minute period. Thereafter, the reaction mixture was heated to reflux (65°C.) and maintained at this level for 6.0 hours. At the completion of the 6 hour period, the reaction mixture was permitted to cool to ambient temperature and stand overnight with stirring. The following day the reaction mixture was again heated to reflux temperature and maintained at this level for 7 hours and was again permitted to stand overnight. The following day, the crude mixture was admixed with 50 milliliters of water with the reaction vessel being maintained at a temperature below 30°C. by positioning the reactor within an ice bath. Sixty-five milliliters of hydrochloric acid dissolved in 150 milliliters of water was then added slowly to the reaction mixture and the total product agitated for 1.0 hour. Then, 200 milliliters of benzene was added to the crude product and the organic water layer separated. The water layer was washed 2 times with 100 milliliters of benzene and the benzene extract and organic layer were combined. This organic layer was then filtered and the benzene and tetrahydrofuran evaporated on a rotary vacuum distillation apparatus.

The product was composed primarily of long chain monoalcohol having 10 carbon atoms.

EXAMPLE 13

To 0.40 moles (16.4 grams) of acetonitrile in 200 milliliters of tetrahydrofuran was added 0.2 mole of isoprene-myrcene magnesium in tetrahydrofuran solvent. During the addition which took about 1 hour the temperature of the reaction mixture was then heated to reflux for 1.5 hours, permitted to cool, treated with 50 milliliters of water and 65 milliliters of 12 Normal hydrochloric acid in 150 milliliters of water. During addition the temperature was maintained below 30°C. The layers were separated and the organic layer was evaporated to yield 42 grams of an orange paste (diketone from bis iminoethylisoprenemyrcene).

EXAMPLE 14

To 0.2 mole of isoprene-myrcene magnesium was added 0.2 mole of acetonitrile in 200 milliliters of tetrahydrofuran. The addition was completed very slowly and the reaction mixture was stirred to insure complete reaction. The reaction mixture was treated with water and HCl as per Example 13 after a period of reflux. After removal of the solvent the final product (mono ketone from monoiminoethylisoprenemyrcene) was distilled under vacuum to yield the following cuts:

| Cut | Vapor Temperature | Pressure (mm.Hg.) | Weight (grams) |
|---|---|---|---|
| 1 | 37°–59°C. | 0.20 | 6 |
| 2 | 59°–100°C. | 0.30 | 5 |
| 3 | 105°–120°C. | 0.30 | 8 |
| 4 | 130°–170°C. | 0.30 | 8 |
| 5(semi-solid) | 170°–205°(main 195°–200°)°C. | 0.30–0.50 | 8 |
| | Residue | | 5 |

Having thus described the general nature and specific embodiments of the present invention, the true scope of the invention is now pointed out in the appended claims.

What is claimed is:

1. A process for the preparation of unsaturated alcohols having at least eight carbon atoms and at least two ethylenic sites of unsaturation, which comprises contacting in the liquid phase (A) a cyclic addition compound containing magnesium and having the general formula: $(R')_n Mg$ wherein $R'$ is a divalent $C_4$-$C_{10}$ acyclic diolefinic radical and $n$ is an integer from 2–8; with (B) an organic 1,2-alkylene oxide having the formula:

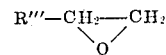

wherein $R'''$ is a hydrogen radical or an organic radical selected from the group consisting of $C_1$–$C_{12}$ alkyl radicals, $C_6$–$C_{12}$ monovalent aryl radicals and $C_7$–$C_{18}$ arylalkyl radicals; further contacting the product of (A) and (B) above with (C) a hydrolyzing agent selected from the group consisting of water and dilute water solutions of hydrochloric acid, acetic, propionic or valeric acids, and thereafter recovering a yield of said alcohols.

2. The process of claim 1 wherein said organic 1,2-alkylene oxide is selected from the group consisting of ethylene oxide, propylene 1,2-oxide and butylene 1,2-oxide.

3. The process of claim 1 wherein said $C_4$–$C_{10}$ acyclic diolefinic radical is selected from the group consisting of butadiene, 2,3-dimethyl butadiene, isoprene, myrcene and mixtures thereof and $n$ is 2.

4. The process of claim 1 wherein said contacting is carried out in the presence of a solvent selected from the group consisting of aromatic hydrocarbons, straight and branched chain aliphatic hydrocarbons.

5. The process of claim 1 wherein said contacting is carried out at a temperature in the range of from 0° to 30°C.

* * * * *